Sept. 2, 1952        P. L. WENTZ        2,608,791

FISHHOOK

Filed Nov. 30, 1950

INVENTOR.
Paul L. Wentz
BY Owen & Owen,

ATTORNEYS

Patented Sept. 2, 1952

2,608,791

UNITED STATES PATENT OFFICE 2,608,791

FISHHOOK

Paul L. Wentz, Fostoria, Ohio

Application November 30, 1950, Serial No. 198,362

2 Claims. (Cl. 43—44.2)

This invention relates to fish hooks, and particularly to those of the plural hook or gang type. In the use of fish hooks, fish frequently grab baited hooks so that the bill end of the hook is disposed flat between the jaws, thus preventing the barbed point from penetrating the soft part of the mouth. This makes it easy for a fish to throw the hook from its mouth and escape.

The object of the present invention is the provision, in combination with a fish hook, of a second or supplemental hook of common fish hook form that is attached to the main hook shank in remote relation to its bill and has its bill disposed adjacent to and crosswise of the main hook bill in substantially enveloping relation thereto and in position to engage a fish mouth in substantially right angular relation to the bill of the main hook. In such manner of engagement, the supplemental hook will penetrate the upper or lower jaw and prevent withdrawal should a fish grab the main hook flatwise between its jaws.

A further object of the invention is the provision in combination with a main fish hook which is to be baited, of a supplemental fish hook that has its bill disposed in adjacent cross relation to the bill portion of the main hook and spring carried by the shank of the main hook so that its bill end may be sprung away from the main hook when the latter is being baited.

Another object of the invention is the provision of a fish hook having improved means for preventing a fish after a strike from throwing the hook from its mouth.

Another object of the invention is the provision of a hook of the character described that is adapted to be drawn through weeds with a minimum likelihood of snagging.

Figure 1:
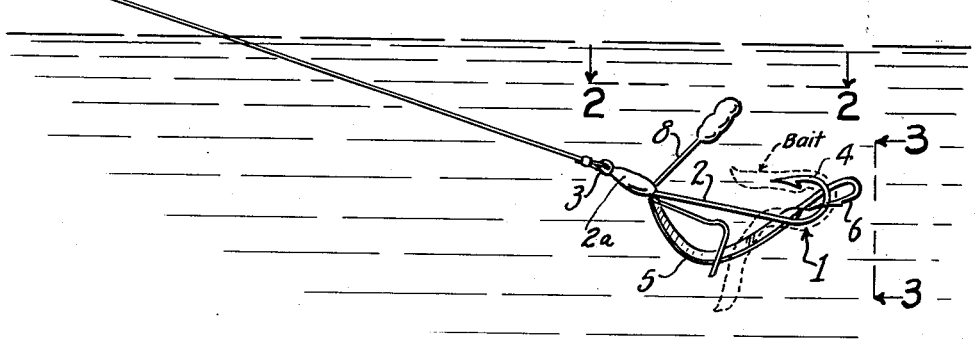
Figure 2:
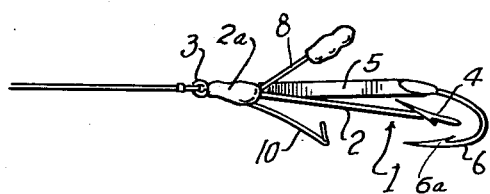
Figure 3:
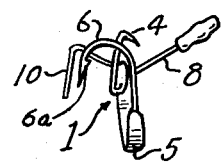
Figures 4, 5:
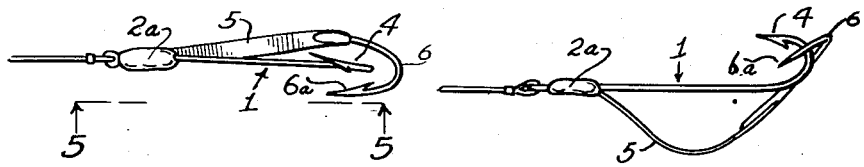

Further objects and advantages of the invention will be apparent from the following detailed description and from the accompanying drawings illustrating one embodiment thereof, in which Fig. 1 is a side perspective view of a fish hook embodying the invention in the position it assumes when being drawn through the water, and showing in dotted lines a bait on the main hook;

Figs. 2 and 3 are top and end views, respectively, of the hook in the position shown in Fig. 1, and Figs. 4 and 5 are top and side views in modified form of the hook in reclining position.

Referring to the drawings, I designates the main hook of the device which, in the present instance, is the same in form as a common fish hook, having a shank 2 with a line attaching eye 3 at its inner end and a barbed hook form of bill 4 at its other end.

Fixedly attached to the shank 2 at a connection point 2ª inwardly from the bill 4, preferably adjacent to the eye 3, and at the side of said shank opposed to the bill 4, is one end of a light elongated spring 5 preferably of flat or ribbon form. This spring is bowed outwardly relative to the hook shank 2 with its free end terminating adjacent to the rear side of the bill 3 and fixedly attached to the short shank of a supplemental hook 6 which extends lengthwise therefrom in adjacent crossing relation to the looped portion of the bill 3. The shank of the hook 6 is inclined or disposed diagonally to the main hook shank 2 and its bill is looped around the loop of the bill 4 crosswise thereof with the barbed point 6ª end thereof at the opposite side of the bill 3 to the shank of the supplemental hook. In this manner, the loop or bill of the hook 6 is crosswise of the bill or loop portion of the main hook and is normally held in close enveloping relation to the bill of the main hook by the action of the spring 5 which is an extension of the shank of the supplemental hook.

The supplemental hook 6 may be sprung outward away from the hook I when the latter is being baited, and when in normal position its bill end may be partially hid by the bait.

It is apparent that with the angular arrangement of the bill end of the two hooks, it is practically impossible for a fish to strike the bait without being hooked by one or the other of the hooks, for if its mouth is flatwise of the main hook it will be engaged by the other, and vice versa. It is found in practice, with the use of this hook, that very few fish are lost after striking.

In order to prevent the main hook from being pulled through the water with its bill point down and thus have a tendency to pick up weeds, especially when riding on the bottom, a weighted finger 8 is projected sideways from the hook shank 2 at or near the point of attachment of the spring 5 thereto and at an angle to the spring. This finger is inclined away from both the shank 2 and the spring 5 toward the bill end of the hook and serves as a counterbalance for the weight of the spring 5, so that when the hook is drawn through the water, the finger 8 and spring will form an obtuse angle with the vertical plane of the shank 2 substantially midway therebetween.

A guard finger 10 projects on an incline rearwardly from the shank 2 at or adjacent to the point of attachment of the spring 5 and finger 8 and substantially midway therebetween. This guard finger cooperates with said spring and finger 8 to prevent fish from grabbing or nibbling the bait from the shank 2 instead of grabbing the bill end of the hook in attempting to get the bait. While the members 8 and 10 are preferably used, they may be omitted, if desired, as shown in Figs. 4 and 5.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A fishing lure comprising a pair of hooks, one hook having a straight shank with a connection point adjacent its upper end and provided also with a bill having a barbed point, said barbed point being in a plane outside of the plane of the shank and bill, a second shank extending from the shank of the first mentioned hook at an acute angle therefrom, said second shank being provided with a curved portion, said curved portion having at one end thereof a bill and barbed point, the bill of the second shank overlapping the bill of the first shank and being normally spaced therefrom, the shanks of the hooks being connected to each other, only at said connection point.

2. A fishing lure comprising a pair of hooks, one hook having a straight shank with a connection point adjacent its upper end and provided also with a bill having a barbed point, said barbed point being in a plane outside of the plane of the shank and bill, a second shank extending from the shank of the first mentioned hook at an acute angle therefrom, said second shank being provided with a curved portion, said curved portion having at one end thereof a bill and barbed point, the bill of the second shank overlapping and extending beyond the bill of the first shank and being normally spaced therefrom, the shanks of the hooks being connected to each other, only at said connection point.

PAUL L. WENTZ.

REFERENCES CITED

The following references are of record in the file of this patent:

UNITED STATES PATENTS

| Number | Name | Date |
|---|---|---|
| 556,694 | Robinson | Mar. 17, 1896 |
| 575,405 | Punches | Jan. 19, 1897 |
| 650,277 | Rossner | May 22, 1900 |
| 1,050,529 | Fearing | Jan. 14, 1913 |
| 1,056,397 | Bonnell | Mar. 18, 1913 |
| 1,717,190 | Coleman | June 11, 1929 |